United States Patent [19]

Nell et al.

[11] Patent Number: 5,611,606
[45] Date of Patent: Mar. 18, 1997

[54] VEHICLE BRAKE-PRESSURE CONTROL DEVICE

[75] Inventors: Joachim Nell, Ostfildern; Torsten Fritzsching, Ludwigsburg; Werner Kruse, Schorndorf, all of Germany

[73] Assignee: Mercedes-Benz AG, Germany

[21] Appl. No.: 326,283

[22] Filed: Oct. 20, 1994

[30] Foreign Application Priority Data

Oct. 20, 1993 [DE] Germany ............... 43 35 769.5

[51] Int. Cl.$^6$ ............................................. B60T 8/42
[52] U.S. Cl. ............................... 303/155; 303/115.2
[58] Field of Search .................................. 303/3, 15, 20, 303/155, 162, 115.2

[56] References Cited

U.S. PATENT DOCUMENTS

| | | |
|---|---|---|
| 4,838,622 | 6/1989 | Kircher et al. . |
| 5,015,040 | 5/1991 | Lin .................................. 303/115.2 X |
| 5,147,117 | 9/1992 | Quinn ................................. 303/115.2 |
| 5,184,877 | 2/1993 | Miyakawa .......................... 303/115.2 X |
| 5,234,263 | 8/1993 | Haerr et al. ......................... 303/115.2 |
| 5,246,281 | 9/1993 | Leppek . | |

FOREIGN PATENT DOCUMENTS

4102497C1 5/1992 Germany .
4103783C2 12/1992 Germany .

Primary Examiner—Lee W. Young
Attorney, Agent, or Firm—Evenson, McKeown, Edwards & Lenahan, P.L.L.C.

[57] ABSTRACT

A brake-pressure control device for a hydraulic multi-circuit brake system provides for brake-pressure generation, in addition to a brake unit, hydraulic regulating cylinders with electromotively drivable pistons. By electronic activation of the cylinders, the wheel brakes can be activated even without the cooperation of the driver. In the regulating cylinders of the front-wheel brakes, the pistons have a basic position, out of which brake-pressure build-up and reduction strokes can be executed. The pistons of the regulating cylinders of the rear-wheel brakes have a basic position which corresponds to the largest volume of the outlet-pressure spaces. The regulating cylinders are equipped with electronic position transmitters. A sensor whose output signal measures the expected value of the vehicle deceleration with which the driver wishes to brake is also provided. The brake-pressure build-up on the rear-wheel brakes takes place solely by the brake-pressure regulating members and on the front-wheel brakes both as a result of the actuation of the brake unit and as a result of the activation of the brake-pressure regulating members with the effect of a follow-up of the pistons into the position linked to the expected value of the vehicle deceleration.

15 Claims, 3 Drawing Sheets

VEHICLE BRAKE-PRESSURE CONTROL DEVICE

BACKGROUND AND SUMMARY OF THE INVENTION

The present invention relates to a brake-pressure control device for a road vehicle which is equipped with devices for anti-lock control (ABS), for electronically controlled brake-force distribution (EBKV) and for drive-slip control (ASR). More particularly, the control device includes brake-pressure regulating members comprising hydraulic regulating cylinders and electromotively drivable pistons therein configured to be activated by output signals from an electronic control unit to control brake-pressure generation in at least individual wheel brakes of the road vehicle in the event of driver-controlled braking and to obtain, independently of an actuation of the brake system by a vehicle driver, a loading of the wheel brake of a driven vehicle wheel tending to spin with brake pressure, necessary for a drive-slip control. In a braking operation controlled by the vehicle driver, an electronic control of front-axle/rear-axle brake force distribution occurs. With anti-lock control on the individual wheels, brake-pressure reduction and brake-pressure rebuild-up phases are controlled, the pistons of at least individual regulating members having as a basic position a middle position, out of which is achieved both a pressure build-up stroke of the respective piston up to the maximum brake-pressure level and, starting from this level, a pressure-reduction stroke down to full pressure relief. The regulating members are equipped with a position transmitter recording a position of the associated piston, and electrically activatable inlet valves are provided for selectively connecting and disconnecting at least individual wheel brakes directly to a pressure outlet of the brake unit.

A brake-pressure control device is described in DE-4,103,783 C2 and comprises, in addition to a driver-actuatable brake unit of the hydraulic multi-circuit brake system for brake-pressure generation, brake-pressure regulating members which are configured as hydraulic regulating cylinders with electromotively drivable pistons. As a result of the activation of the regulating members by way of output signals from an electronic control unit, brake-pressure generation can be controlled in at least individual wheel brakes of the vehicle in the event of driver-controlled braking and, independently of an actuation of the brake system by the driver, the loading with brake pressure of the wheel brake of a driven vehicle wheel tending to spin, necessary for drive-slip control, can be achieved.

In the event of braking which the driver controls with the known system, an electronic control of the front-axle/rear-axle brake-force distribution can be achieved by the brake-pressure regulating members. In the event of anti-lock control on the individual wheels, brake-pressure reduction and brake-pressure rebuild-up phases can be controlled by the brake-pressure regulating members, with the pistons of at least some of the regulating cylinders having as a basic position a middle position, out of which both a pressure build-up stroke up to the maximum brake-pressure level and, starting from this level, a pressure-reducing stroke down to full pressure relief can be achieved. These regulating cylinders are equipped with a position transmitter recording the piston position. There are also provided electrically actuatable inlet valves, by way of which at least some of the wheel brakes can be connected directly to the pressure outlet of the brake unit and can be shut off relative thereto.

In the known brake-pressure control device, the position-monitored brake-pressure regulating members are assigned to the driven rear wheels of the vehicle. The pistons of the pressure modulators assigned individually to the front-wheel brakes have a basic position in which the volumes of the outlet-pressure spaces of these pressure modulators are minimal. In these basic piston positions, inlet valves controlled mechanically thereby are maintained in their open basic position, in which the connected wheel brakes can be loaded with a brake pressure. When the brake-pressure regulating members are actuated with the effect of enlarging their outlet-pressure spaces, after a brief initial portion of the pressure-reducing stroke of the regulating-member pistons, the inlet valves change over to their closing positions, after which, as a result of further piston displacement, corresponding pressure reduction in the particular connected wheel brake is achieved.

An automatic actuation of one or both front-wheel brakes, for example for the purpose of regulating the driving dynamics with the effect of achieving a desired steering behavior of the vehicle, is not possible with the known brake-pressure regulating device. It would, if appropriate, be possible to consider utilizing the brake-pressure regulating members, provided for the rear-wheel brakes for the purpose of drive-slip and anti-lock control, with the neutral middle position of the pistons, also for the front-wheel brakes and, during the normal operation of the brake system, (that is to say an operation not subjected to anti-lock control), feeding the outlet pressure of the brake unit into the wheel brakes via the outlet-pressure spaces of the brake-pressure regulating members.

However, with such a possible modification of the known brake-pressure regulating device, the modification being suitable theoretically for regulating the driving dynamics, a highly unfavorable pedal characteristic would occur in the normal braking mode. That is, on account of the large volumes of the outlet-pressure spaces of the brake-pressure spaces of the brake unit, relatively large-volume sealing rings or sealing sleeves would also be required for sealing off the pistons of the brake-pressure regulating members relative to their housings. These sealing rings or sealing sleeves would also be deformed increasingly under an increasing pressure and consequently lead to a "flexibility", i.e., a soft reaction, of the brake pedal. As a result, there would also be an increase in the pedal travel which not only would be felt as extremely uncomfortable, but is also undesirable for ergonomic reasons, because the actuating angle, within which the driver can generate his highest actuating force, is narrowly restricted, and therefore long pedal travels are also disadvantageous for safety reasons.

If, on the other hand, pressure modulators of the type described in DE 4,103,783 C2, in which the basic position of the modulator pistons corresponds to the largest volume of the outlet-pressure spaces, were used as brake-pressure regulating members for the front-wheel brakes, then, in order to guarantee anti-lock control, these modulators would also have to be utilized for the normal braking mode and therefore be shut off relative to the brake unit. This has the disadvantageous result of the brake pedal then being unfavorably "hard" and a pedal-travel simulator would therefore be necessary. In turn, this has the further disadvantageous result that the brake-pedal reaction would be determined solely by the travel simulator, for example a compressible spring, and would be, at most, an approximation of the brake pressures.

Travel simulators with this function are provided, for example, in the brake-pressure control device described in DE 4,102,497 C1, which effects automatically controlled braking when the driver actuates the brake pedal at a speed $\dot{\phi}$ which is higher than a relevant threshold value $\dot{\phi}_S$, which an electronic control unit interprets as an indication that the driver would like to initiate full braking with high vehicle deceleration. In such a situation, the brake circuits in the known brake-pressure control device are shut off relative to the pressure outlets of a tandem master cylinder assigned thereto and, instead, there are connected to these pressure outlets buffer accumulators, into which brake fluid can be forced out of the master cylinder even under moderate actuating force, so that the driver's wish, which is recorded by a pedal-position transmitter, continues to remain recognizable.

In the known brake-pressure control device, the brake-pressure generation takes place, during automatically controlled full braking, by pressure modulators which are assigned individually to the brake circuits and are activated hydraulically by the outlet pressure of a high-pressure pump and the outlet pressure of which is metered to the brake circuits via metering valves actuatable in a pulsed manner. Inserted between these pressure outlets of the pressure modulators and the wheel brakes is the hydraulic unit of a standard anti-lock system which, if appropriate, is also utilized for carrying out a drive-slip control. In this further known brake-pressure control device, the buffer accumulators and the control valves necessary for coupling them to the brake unit are required purely for automatic full braking, thus to that extent implying considerable technical outlay.

Proceeding from a known brake-pressure control device, therefore, an object of the invention is to improve such a brake-pressure control device so that, on one hand, it allows, without appreciable extra outlay, further possibilities of regulation and/or control, such as, for example, control of driving dynamics and/or, if necessary, automatically controlled full braking; on the other hand, in normal braking operation, that is to say operation not subjected to anti-lock control, it allows a sensitive reaction behavior of the brake pedal and the generation of high brake forces, along with a nevertheless "short" ergonomically favorable pedal travel.

This object has been achieved according to the present invention by providing that the brake-pressure regulating members, at least for the front-wheel brakes, are configured such that the pistons have a basic position out of which brake-pressure build-up and reduction strokes can be executed. Brake-pressure regulating members for the rear-wheel brakes are configured such that a basic position of the pistons corresponds to the largest volume of the outlet-pressure spaces of the brake-pressure regulation members. In normal braking, i.e. braking not subjected to anti-lock control, these brake-pressure regulating members are also utilizable for brake-pressure generation and are shut off relative to the brake unit of the brake system.

According to another aspect of the present invention, at least one sensor is configured to generate an output signal which is fed to the electronic control unit and which, when braking is initiated and controlled by the vehicle driver, is a measure of expected value of the vehicle deceleration. From comparative processing of the sensed signals characteristic of the piston positions of the brake-pressure regulating members of the front-wheel brakes with the sensed signals characteristic of the expected value of the vehicle deceleration, the electronic control unit is operable to generate activating signals for the drives of the regulating members of the front-wheel brakes to cause the pistons to move into the position assigned to the expected value and also activating signals for the brake-pressure build-up operation of the brake-pressure regulating members of the rear-wheel brakes.

Accordingly, for the front-wheel brakes brake-pressure regulating members, the pistons of which have the basic position, are provided out of which they can execute brake-pressure build-up and reduction strokes. For the rear-wheel brakes brake-pressure regulating members of that type in which the basic position of the pistons corresponds to the largest volume of the outlet-pressure spaces of these brake-pressure regulating members are provided. These rear-wheel brake regulating members are utilized for brake-pressure generation and are shut off relative to the brake unit of the brake system even in the event of normal braking not subjected to anti-lock control. Furthermore, at least one sensor generates an output signal which is fed to the electronic control unit so that, in the event of braking initiated by the driver and continuing to be controlled, is a measure of the expected value (driver's wish) of the vehicle deceleration. The electronic control unit is configured so that, from a comparative processing of the signals characteristic of the piston positions of the brake-pressure regulating members of the front-wheel brakes with a signal characteristic of the expected value of the vehicle deceleration, it generates activating signals for the drives of the brake-pressure regulating members of the front-wheel brakes with the effect of the follow-up of their pistons into the position assigned to the expected value.

Included among the advantageous functional properties of the brake-pressure control device according to the present invention is the brake-pressure control device allowing an automatic activation of the brakes both of the driven and of the non-driven vehicle wheels. This activation is a precondition for a "complete" control of the driving dynamics, and the possibility of automatically controlled full braking, the need for which can be recognized from the sensor output signal characteristic of the driver's wish, for example as a result of a time-differentiating processing of this signal. Thus, when the driver actuates the brake pedal hastily, full braking with a maximum pressure-rise rate can already be initiated when the actuating speed exceeds a threshold value. In this situation, the inlet valves are closed and the brake pressures are initially generated solely by the brake-pressure regulating members.

The brake-pressure regulating members can also be used in the manner of a parking brake such that, in slow-moving traffic requiring frequent stopping and starting again after braking in which the vehicle has come to a standstill, the inlet valves are held closed without the driver having his foot on the pedal, until the driver actuates the accelerator pedal again. The brakes are relieved of pressure to the reservoir via the non-actuating master cylinder of the brake system.

Because a considerable part of the brake-fluid quantity displaced towards the wheel brakes is fed into the wheel brakes by the brake-pressure regulating members, for normal braking operation a markedly reduced pedal travel and, therefore, a sensitive reaction behavior of the brake pedal are obtained, with the driver being informed directly of the pressure prevailing in the wheel brakes.

Due to the property of the brake-pressure control device according to the present invention that the brake-fluid quantity, $m_S$, which can be forced into the front-wheel brakes by the brake-pressure regulating members, is controlled electronically, a ratio, $m_S/m_B$, constituting the brake fluid quantity, $m_S$, to the brake-fluid quantity forced into the front-wheel brakes as a result of the actuation of the master cylinder, $m_B$, can be adjusted so that, in principle, any pedal-travel/brake-pressure characteristics can be preset by the configuration of the electronic control unit and, if appropriate, can be changed at the request of the vehicle owner.

Adjustability in this regard can be effected in a simple way by configuring the electronic control unit so a weighting factor adjustment effects adjustment of the ratio of brake-fluid quantity forced into the front-wheel brakes via the associated brake-pressure regulating members to the brake-fluid quantity forced into the front-wheel brakes as a result of actuation of a master brake cylinder. As a result, the sensor output signal representing the driver's wish is comparable with the position actual-value signal of the position sensor monitoring the piston position of the respective brake-pressure regulating member of the front-wheel brakes. This also allows the drive control of the brake-pressure regulating members to be implemented in the manner of a very "rapid" sensitive analog control which can also be effected by the simplest possible circuitry, for example by activating the electromotive drives of the brake-pressure regulating members by an activating signal corresponding in amount and sign to the "difference" between the pedal-position-sensor signal and the piston-position-sensor signal.

By the utilization of further measures in which the weighting factor for the signal representing the driver's wish can be varied as a function of the sensor output signal characteristic of the position of the piston of the brake-pressure regulating member and the variation of the weighting factor for the sensor signal representing the driver's wish takes place with an increasing pressure build-up displacement of the pistons of the brake-pressure regulating members of the front-wheel brakes, with the effect of a reduction or appropriately modified, correspondingly diverse and more or less progressive pedal-travel/brake-pressure characteristics can be achieved.

The brake-pressure control device is configured such that the brake-pressure regulating members of the wheel brakes, for example front-wheel brakes, respectively combined in a brake circuit have a self-locking drive, characterized in that the main brake line of this brake circuit, the main brake line being connected to the brake unit, can be shut off relative to the brake unit by means of an electrically activatable change-over valve, and in that there are provided non-return valves which are connected parallel to the inlet valves of this brake circuit and are loaded in an opening direction by a relatively higher pressure in the wheel brakes of the brake circuit than at a brake-side connection of the change-over valve. With the change-over valve opened, a brake-pressure reduction via non-return valves can be achieved, even when the current supply for the regulating-member drives has failed and also should at least one of the associated inlet valves remain in its shut-off position as a result of a malfunction. For a control of driving dynamics, the change-over valve is closed.

Since an amount of the brake pressure which corresponds to the amount necessary for obtaining a maximum vehicle deceleration can be built up in the individual wheel brakes by the brake-pressure regulating members, the brake-pressure regulating members as a whole can also be utilized as a "hydraulic brake booster", so that it is possible to have the configurations of the brake system of the vehicle in which the brake unit is a static dual-circuit master cylinder which can be actuated directly by means of the brake pedal of the brake system or as a single-circuit master cylinder which can be actuated directly by means of the brake pedal of the brake system and to which are connected the front-wheel brakes combined to form a front-axle brake circuit. Thereby, even in the event of a failure of the brake-pressure regulating members, a sufficient minimum deceleration of the vehicle can still be achieved.

Alternatively, the brake-pressure control device can be configured with brake-pressure regulating members as pressure modulators and with inlet valves assigned individually to the rear-wheel brakes. The brake-pressure regulating members can also be configured in the way to dispense with the need for inlet valves.

In combination with the foregoing, the compensating channels can be configured as simple snifting holes, because the function of the brake-pressure regulating members guarantees that piston gaskets are not exposed to any appreciable pressure when they run over the snifting holes.

The advantage of having non-self-locking electromotive drives of the brake-pressure regulating members is that non-return safety valves otherwise necessary are not required.

A pressure sensor which records the pressure generated in the master cylinder, with its output signal being a measure of the force with which the driver actuates the brake pedal, is an additional way for reliably recognizing the driver's wish with regard to the development in time of the vehicle deceleration.

Pressure sensors provided for at least one of the rear-wheel brakes and/or at least one of the front-wheel brakes improve the reliability of an electronic control of the brake-force distribution and/or of a control of driving dynamics.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
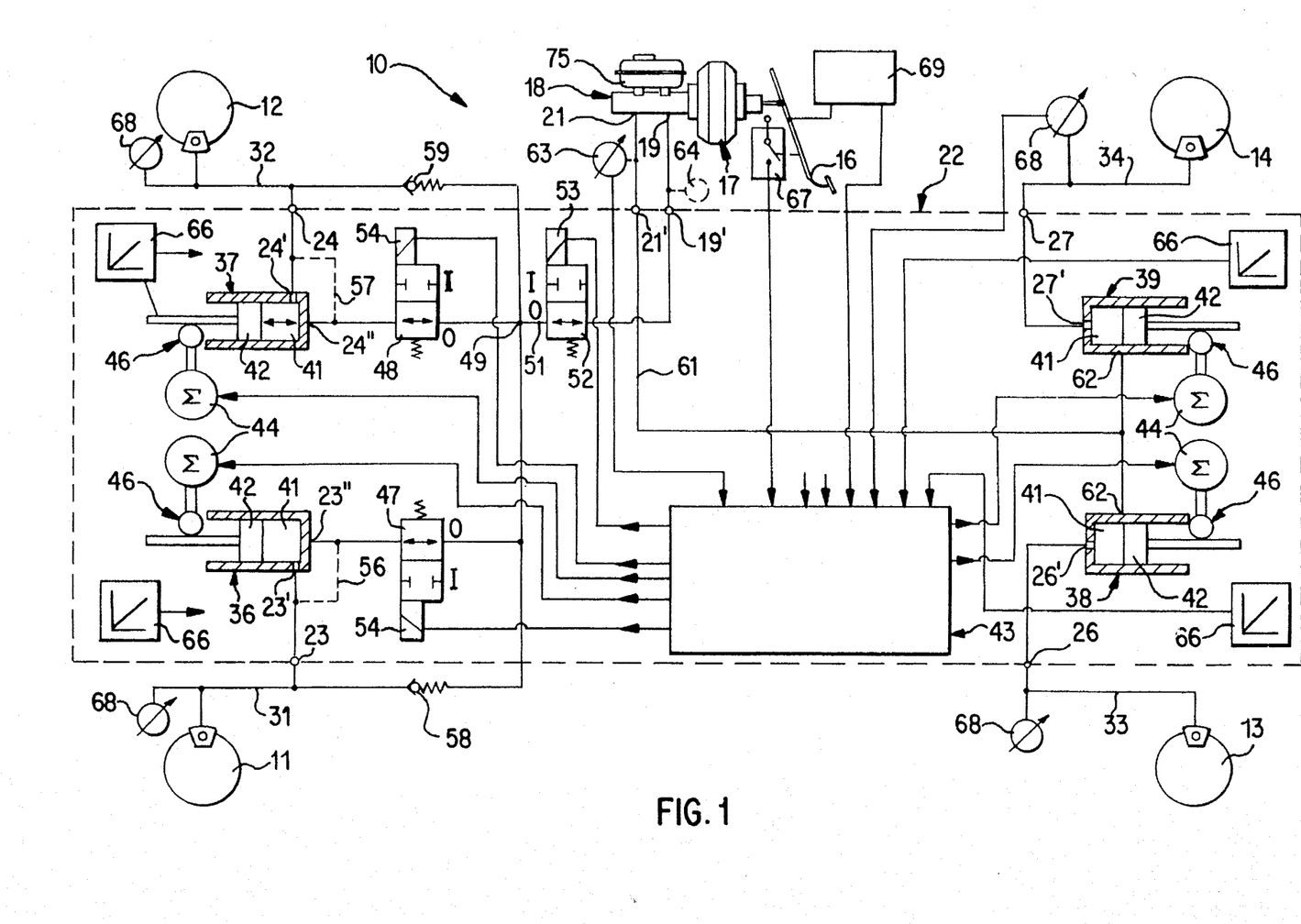
FIG. 1 is a schematic electrohydraulic diagram of one embodiment of a brake-pressure control device according to the present invention for a dual-circuit brake system with front-axle/rear-axle brake-circuit division and with a tandem master cylinder, as a brake unit, actuatable via a pneumatic brake booster.

For a road vehicle hydraulic dual-circuit brake system, designated generally by the numeral 10 in FIG. 1, it is assumed for purposes of explanation, but without restrictions as to the applicability of the present invention, that the front-wheel brakes 11, 12 are combined to form a front-axle brake circuit I and the rear-wheel brakes 13, 14 are combined to form a brake circuit II, and that the vehicle has a rear-axle drive. The same assumptions also applies to the dual-circuit brake systems 20, 30 in FIGS. 2 and 3, respectively, which are functionally similar to the brake system 10 in FIG. 1.

A brake unit in the brake system 10 is provided so that, in the event of braking, the driver can control the brake-pressure generation in the brake circuits I and II. A master cylinder 18, for example a tandem master cylinder, is actuated by a brake pedal 16 via a brake booster 17, for example a pneumatic brake booster, and has a pressure outlet 19 assigned to the front-axle brake circuit I and a pressure outlet 21 assigned to the rear-axle brake circuit II. At these pressure outlets, static outlet pressures capable of being fed into the wheel brakes 11 to 14 are supplied in the event of an actuation of the brake unit 18.

The pressure outlets 19, 21 of the brake unit 18 are each connected individually to one of the two supply connections 19', 21', respectively, of a brake-pressure control device designated generally by the numeral 22 and having brake-pressure outlets 23, 24 and 26, 27 which are assigned individually to the respective wheel brakes 11 to 14 and to which are connected the wheel-brake lines 31, 32 and 33, 34 leading to the left-hand front-wheel brake 11 and the right-hand front-wheel brake 12 as well as to the left-hand rear-wheel brake 13 and the right-hand rear-wheel brake 14.

Within the brake-pressure control device 22 indicated by dash lines in FIG. 1, brake-pressure regulating members 36, 37 and 38, 39 are respectively assigned individually to the front-wheel brakes 11 and 12 and to the rear-wheel brakes 13 and 14. By way of the regulating members 36–39, in the course of a braking operation triggered by the driver as a result of the actuation of the brake pedal 16 and/or controlled in terms of the brake-pressure generation in the wheel-brake circuits I and II, the outlet pressures supplied at the brake-pressure outlets 23, 24 as well as 26, 27 of the brake-pressure regulating device 22 and corresponding to the wheel-brake pressures can be modulated. This modulation can be used to lower the brake pressure for the purpose of anti-lock control on individual or a plurality of wheel brakes, or to obtain an optimum control of the front-axle/rear-axle brake-force distribution, for example with the effect of achieving an ideal brake-force distribution. This modulation can also be used to carry out automatically controlled full braking, by way of which, however, individual or a plurality of wheel brakes can also be activated, without the driver actuating the brake pedal 16, for example for the purpose of drive-slip control by the braking of a vehicle wheel tending to spin or for the purpose of headway control by activating all the wheel brakes in a manner metered according to the particular situation, and/or to control driving dynamics which may require a controlled activation of the wheel brake or wheel brakes of an individual driven or non-driven vehicle wheel or a plurality of vehicle wheels, in order, for example, to guarantee a dynamically stable steering behavior of the vehicle.

The brake-pressure regulating members 36 to 39, in terms of their basic construction, are configured as hydraulic regulating cylinders which have an outlet-pressure space 41 respectively connected to one of the brake-pressure outlets 23, 24 and 26, 27 of the brake-pressure regulating device 22 and limited movably on one side by a piston 42 which is guided displaceably in a pressure-tight manner in the cylinder housing. As a result of the displacement of the piston 42 in the direction of a reduction of the volume of the outlet-pressure space 41, pressure can be built up in the pressure space 41, whereas as a result of the displacement of the piston 41 in the direction of an increase in volume in the pressure space 41, the pressure in the outlet-pressure space 41 and therefore also in the connected wheel brake can be reduced.

Individual electric motors 44 can be provided for driving pistons 42 and can be driven in alternate opposite rotational directions by output signals from an electronic control unit 43 of the brake-pressure regulating device 22. The pistons 42 are drive-coupled to the output shafts of the motors 44 by suitable conventional gears 46, indicated merely schematically in FIGS. 1 to 3. As a result of the positive engagement of the driving and driven elements, a conversion of the rotational movements of the armatures of the electric motors 44 which is clearly correlated with lifting movements of the pistons 42 is effected.

Figure 2:
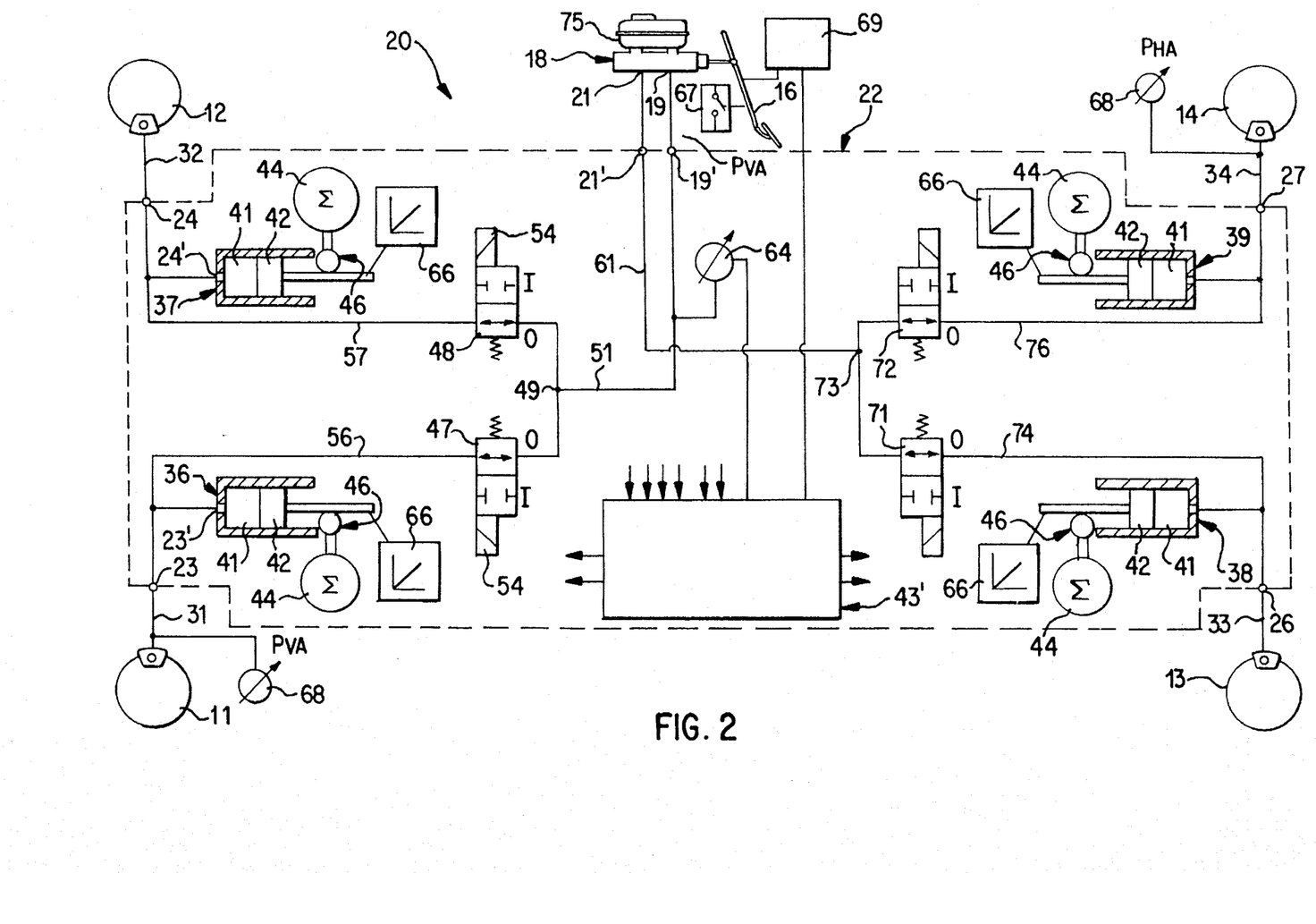
FIG. 2 is another embodiment of a brake-pressure control device according to the present invention for a hydraulic dual-circuit brake system with a dual-circuit master cylinder actuatable directly via the brake pedal.
Figure 3:
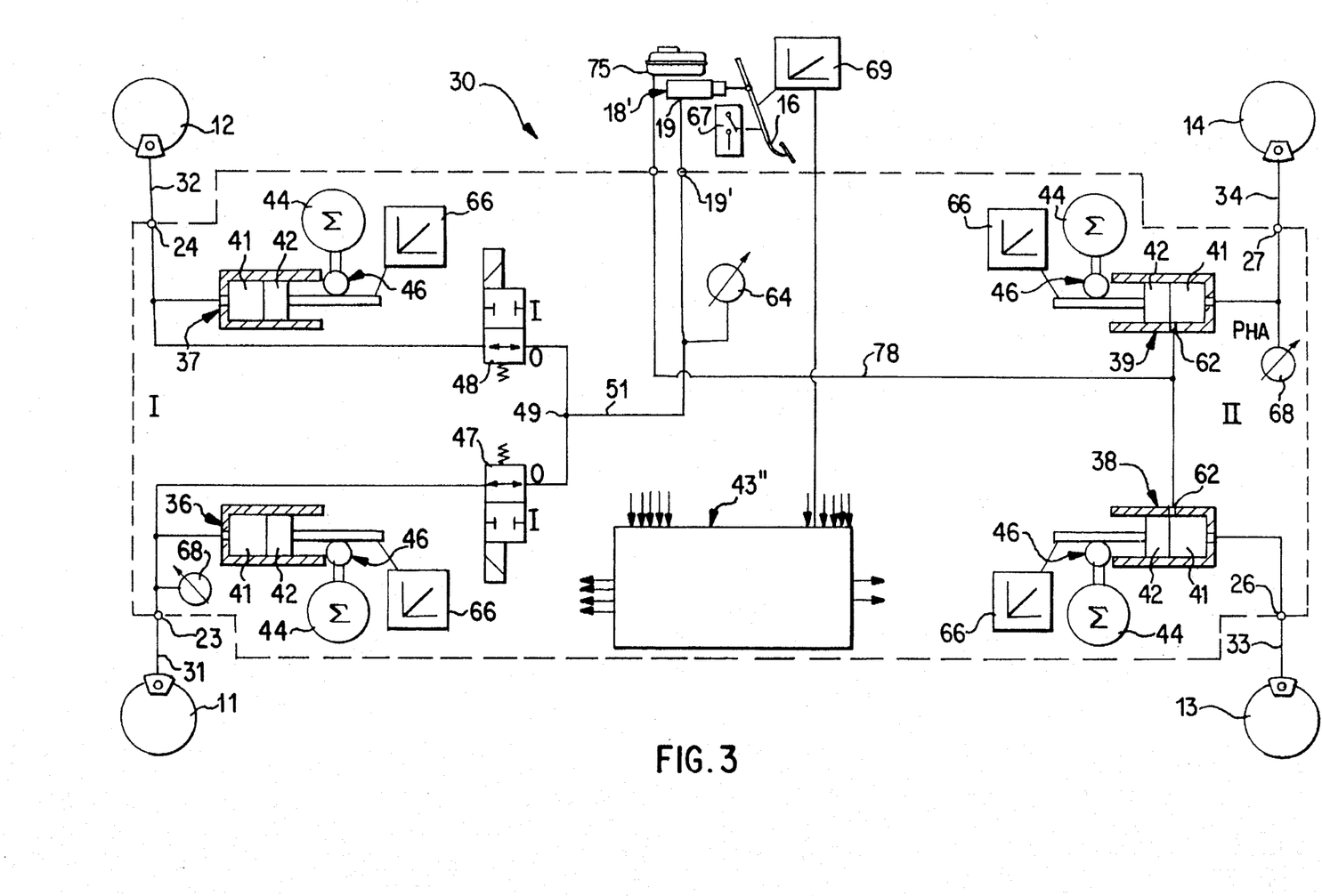
FIG. 3 is a schematic diagram similar to FIGS. 1 and 2 of an embodiment of a brake-pressure control device functionally similar to the brake-pressure control devices of FIGS. 1 and 2, for a brake system in which there is provided as a brake unit a basic single-circuit master cylinder which can be actuated directly by the brake unit of the brake system and o which only the front-axle brake circuit is connected.

The gears 46 can be advantageously configured as spindle drives, of which the driving spindles or driving nuts engaged with the pistons 42 are driven via spur gears which bring about different drive transmission ratios in alternate directions of rotation. This is obtainable, for example, by spur gears which are provided with free-wheel couplings blocking or co-rotating in alternate directions of rotation. The pressure build-up displacement movement of the pistons 42 is assigned a lower gear transmission ratio than the pressure-reducing movement.

A branch point 49 of a main brake line 51 assigned to the front-axle brake circuit I connected, via a respective inlet valve 47, 48, to the brake-pressure outlets 23, 24 of the brake pressure regulating device 22 which are respectively assigned individually to the two front-wheel brakes 11, 12 and which are connected directly to the pressure outlets 23', 24' of the two brake-pressure regulating members 36, 37 provided for the front-wheel brakes 11, 12 or are formed directly by their pressure outlets 23', 24'. The branch point 49 feeds the outlet pressure $P_{VA}$ supplied at the pressure outlet 19 of the tandem master cylinder 18 assigned to the front-axle brake circuit I into the wheel brakes 11, 12.

In the embodiment of the brake-pressure control device 22 of FIG. 1, the branch point 49 is connected to the supply connection 19' of the brake-pressure control device 22, and the supply connection 19' is assigned to the front-axle brake circuit I and, via a change-over valve 52, connected hydraulically to the corresponding pressure outlet 19 of the master cylinder 18. The valve 52 is a 2/2-way solenoid valve activatable by output signals of the electronic control unit 43 and, in its basic position 0 (a through-flow position), connects the supply-pressure connection 19' of the brake-pressure control device 22 to the branch point 49 of the main brake line 51 whereas, in its blocking position I assumed when its control magnet 53 is energized by an output signal from the electronic control unit 43, shuts off the branch point 49 of the main brake line 51 of the rear-axle brake circuit II relative to the supply connection 19' of the brake-pressure regulating device 22 or relative to the pressure outlet 19 of the master cylinder 18 assigned to the supply connection 19'.

The inlet valves 47, 48 are likewise configured as 2/2-way solenoid valves whose basic position 0 is a throughflow position, in which the branch point 49 of the main brake line 51 is connected to the respective brake-pressure outlet 23 or 24 of the brake-pressure control device 22, and, when the control magnets 54 are energized by an output signal from the electronic control unit 43, assume a blocking position I in which the branch point 49 of the main brake line 51 is shut off relative to the respective brake-pressure outlet 23 or 24 of the brake-pressure regulating device 22.

In FIG. 1, the inlet valves 47, 48 are inserted between the branch point 49 of the main brake line 51 and a respective inlet connection 23", 24" of the outlet-pressure space 41 of the respective brake-pressure regulating member 36, 37 of the left-hand front-wheel brake 11 and of the right-hand front-wheel brake 12 (as represented by the solid lines in FIG. 1, or, as indicated by dashed lines in FIG. 1 by flow paths 56, 57) and are connected directly to the brake-pressure outlets 23, 24 of the brake-pressure regulating device 22 as shown in the embodiment of FIG. 2.

The blocking position I of the change-over valve 52 of the brake-pressure control device 22 of the brake system 10 is assigned to those brake system functions in which an activation of at least one of the front-wheel brakes 11 and 12 must be capable of taking place, without the driver actuating the brake pedal 16. There is inserted parallel to the inlet valves 47, 48, that is to say, respectively between the branch point 49 of the main brake line 51 of the front-axle brake circuit I and the relevant brake-pressure outlets 23, 24 of the brake-pressure regulating device 22, a respective non-return valve 58, 59 which is loaded in the opening direction by a relatively higher pressure at the respective brake-pressure outlet 23 or 24 than at the branch point 49 and which is otherwise shut off.

With the change-over valve 52 opened, a brake-pressure reduction in the front-wheel brakes 11 and/or 12 of the brake system 10 is possible via these non-return valves 58, 59, by an "easing" of the brake pedal 16, even when, as a result of a malfunction of at least one of the inlet valves 47, 48, the brake-pressure outlet 23 or 24 of the brake pressure regulating device 22 is shut off relative to the branch point 49 of the main brake line 51.

Further functional elements relating to the rear-axle brake circuit II of the brake system 10 will now be made by reference to FIG. 1. The brake-pressure regulating members 38, 39 of the rear-axle brake circuit II are single-circuit master cylinders whose pressure outlets 26', 27' are connected directly to the respective brake-pressure outlets 26, 27 of the brake-pressure control device 22. The internal main brake line 61 of the rear-axle brake circuit II starting from the supply connection 21' for the rear-axle brake circuit II is connected to snifting holes 62 of the brake-pressure regulating members 38, 39. The snifting holes 62 are opened in the basic positions of the pistons 42 of the brake-pressure regulating members 38, 39 corresponding to the maximum volume of the outlet-pressure spaces 41 thereof, so that, in these basic positions, there is a communicating connection between the rear-axle outlet-pressure space of the brake unit 18 and the rear-wheel brakes 13, 14 which can be loaded with the outlet pressure of the brake unit 18. However, this method of supplying brake pressure to the rear-wheel brakes 13, 14 is only for the emergency situation in which the brake-pressure regulating members 38, 39 are not ready to function. In the "normal", that is to say, fault-free operation of the brake system 10, the brake-pressure build-up in the rear-wheel brakes 13, 14 occurs as a result of the motor-controlled displacement of the pistons 42 of the brake-pressure regulating members 38, 39. The connection of outlet-pressure spaces 41 of the pistons 42 to the brake unit 18 is shut off already after a small initial portion of the pressure build-up stroke of the pistons 42 after these have passed the snifting holes 62. The development in time of the brake pressure in the rear-wheel brakes, which can be controlled by the electronic control unit 43 via the current supply of electric motors 44 of the brake-pressure regulating members 38, 39, follows the driver's wish recognizable from the development in time of the output signal fed as an input to the electronic control unit 43 and coming from an electro-mechanical or electronic pressure sensor 63. Consequently, the pressure at the pressure outlet 21 of the brake unit 18 assigned to the rear-axle brake circuit II is recorded.

As represented by broken lines in FIG. 1, a pressure sensor 64 can also be provided for recognizing the driver's wish, alternatively or additionally to the pressure transmitter 63 by recording the pressure $P_{VA}$ supplied at the primary pressure outlet 19 of the brake unit 18 and, in contrast to the rear-axle brake circuit II, fed directly as brake pressure in the front-axle brake circuit I.

Input signals which are processed by electronic control unit 43 into activating signals for the brake-pressure regulating members 36 to 39, include the output signals of position transmitters 66 which are assigned individually to the brake-pressure regulating members 36 to 39 to record the positions of the pistons 42 of the brake-pressure regulating members 36 to 39 and a signal which is triggered with the response of the brake-light switch 67 to indicate the start of braking.

Further inputs which can be processed by the electronic control unit 43 into activating signals for the brake-pressure regulating members 36 to 39 are the output signals of pressure sensors 68 assigned individually to the wheel brakes 11 to 14, as brake-pressure actual-value signals, and the output signals of a pedal-position transmitter 69 configured to have a time trend utilizable for an early recognition of the driver's wish.

In the illustrated embodiments of FIGS. 1–3, the pistons 42 of the brake-pressure regulating members 36, 37 of the respective two front-wheel brakes 11, 12 have a middle position as a basic position, out of which, with the inlet valve 47 or 48 closed, they can be displaced to increase the volume of the respective outlet-pressure space, as far as is necessary, for making it possible to reduce the brake pressure in the respective connected wheel brake 11 or 12 completely, and out of which, with the inlet valve 48 closed and the change-over valve 52 blocked, they can be displaced with the effect of reducing the volume of the outlet-pressure space 41 of the respective brake-pressure regulating member 36 or 37, so far that a maximum value of the brake pressure of approximately 200 bar can be built up in the respective connected front-wheel brake 11 or 12.

The electromotive drives 44, 46 provided for the brake-pressure regulating members 36, 37 of the front-axle brake circuit I are self-locking, so that their pistons 42 remain, as it were, "of themselves" in a position assumed as a result of the activation of their drive 44, 46 and monitored by the position transmitters 66 or, as long as activation does not occur, in their basic positions. Alternatively to a self-locking configuration of the drives 44, 46, the motors 44 can also be provided with brakes (not shown).

The electromotive drives 44, 46 provided for the brake-pressure regulating members 38, 39 of the respective rear-wheel brakes 13, 14 are not self-locking, so that, in the event of a brake-pressure reduction taking place on the rear-wheel brakes 13, 14, the brake pressure assists the pressure-reducing movement of the pistons 42 of these brake-pressure regulating members 38, 39.

With the constructional features of the brake system 10 as explained above, the following functions can be performed:

a) Target Braking Including Electronically Controlled Brake-Force Distribution (EBKV)

In target braking, in which the brake-pressure development in time is controlled essentially by the driver via the brake pedal 16, the inlet valves 47, 48 and the change-over valve 52 remain in their basic or throughflow positions 0 so that brake fluid can be forced into the front-wheel brakes 11, 12 from the brake unit 18. With the response of the brake-light switch 67, the brake-pressure regulating members 36, 37 of the front-wheel brakes 11, 12 are also activated in order to execute brake-pressure build-up strokes of their pistons 42, such that their piston positions monitored by the position transmitters 66 correspond respectively to such that the brake-fluid quantities $m_B$ and $m_S$, forced into the front-wheel brakes, on one hand, by the brake unit 18 and, on the other hand, by the brake-pressure regulating members 36, 37, correspond overall to that brake-fluid quantity which has to be forced into the wheel brakes 11, 12 to establish therein a pressure which corresponds to the pressure recorded by the pressure sensor 64 provided for the front-axle brake circuit I or by the pressure sensor 63 provided for the rear-axle brake circuit II.

From the moment of response of the brake-light switch 67 onwards, the brake-pressure build-up on the rear-wheel brakes 13, 14 takes place as a result of the activation of their respective brake-pressure regulating members 38, 39, with their initial pressure following the outlet pressure of the brake unit 18, monitored by the pressure sensors 63 and/or 64 and having virtually the same value at the two pressure outlets 19 and 21 of the brake unit 18, such that a desirable, for example ideal brake-force distribution (that is to say one corresponding to an identical utilization of tire/road adhesion on the front wheels and the rear wheels) is obtained. At the same time, the output signals from the pressure sensors 68 assigned individually to the wheel brakes 11 to 14 can be utilized as a direct measure of the actual values of the pressures in the front-wheel brakes 11, 12 and in the rear-wheel brakes 13, 14 and can also be utilized for correcting the piston positions recorded by the position sensors, while the information output signals generated by the pressure sensors 68 are to be "dominant", in relation to the output signals containing as it were "only" desired-value information from the position transmitters 66, for evaluation by the electronic control unit 43.

The reaction force, counter to which the driver actuates the brake pedal 16 in the event of target braking, is a direct measure of the brake pressure $P_{VA}$ fed into the front-wheel brakes. The pedal travel, which is necessary so to speak for physiological reasons so that the driver, by actuating the brake pedal 16, can select a desired vehicle deceleration sufficiently accurately, is predetermined by and/or is adjustable as a result of the configuration of the brake-pressure control device 22 by way of the ratio $m_S/m_B$ of the brake-fluid quantity, $m_S$, forced into the front-wheel brakes 11, 12 via the brake-pressure regulating members 36, 37 to the brake-fluid quantity, $m_B$, forced into the front-wheel brakes 11, 12 as a result of the actuation of the master cylinder 18.

b) Anti-Lock Control (ABS):

The anti-lock control on the rear wheels of the vehicle, which usually commences with a brake-pressure reduction phase, necessitates merely a corresponding activation of the brake-pressure regulating members 38, 39 of the rear-wheel brakes 13, 14.

For anti-lock control on the front-wheel brakes, the respective inlet valve 47 and/or 48 of the wheel brake subjected to the control is closed, with the result that the brake-pressure holding function can be achieved. A brake-pressure reduction phase of the anti-lock control is likewise possible on the front-wheel brakes 11, 12 with the inlet valve 47 or 48 closed, by activating the respective brake-pressure regulating member 36 or 37 with the effect of increasing its outlet-pressure space 41. Brake-pressure rebuild-up phases of the anti-lock control are achieved, with the inlet valve 47 or 48 closed, by activating the respective brake-pressure regulating member 36 or 37 with the effect of reducing the volume of the respective outlet-pressure space 41. Such a brake-pressure build-up operation of the respective brake-pressure regulating member 36 and/or 37 is terminated as soon as the electronic control unit 43 recognizes from the output signal of the respective position transmitter 66 that the regulating-member piston 42 has reached its neutral middle position again, after which the inlet valve 47 or 48 of the wheel brake 11 and/or 12 subjected to control is reset to its open basic position 0 again, and, for the further brake-pressure build-up, the outlet pressure of the brake unit 18 again is fed into the front-wheel brake 11 or 12 by the pulsed activation of the respective inlet valve 47 or 48 and a corresponding activation of the brake-pressure regulating member 36 and/or 37. A brake-pressure rebuild-up phase of the anti-lock control can also be achieved, with the inlet valve 47 or 48 closed, by a further pressure build-up activation of the brake-pressure regulating member 36 or 37, until pressure equality in the wheel brake 11 or 12 subjected to the control and at the pressure outlet 19 of the brake unit 18 is reached. This equality is recognizable, for example, from the output signals of the pressure transmitter 63 or 64 monitoring the outlet pressure on the master cylinder 18 and from the output signals of the position transmitter 66 of the wheel brake subjected to the control and/or of the pressure sensor 68 assigned thereto, after which the respective inlet valve 47 or 48 is reset to its open position again and thereafter only the piston 42 of the brake-pressure regulating member 36 or 37 utilized for the pressure build-up control is activated again.

c) Drive-Slip Control (ASR):

The necessary activation for drive-slip control of one or both wheel brakes 13 and/or 14 of the driven vehicle wheels, without the cooperation of the driver, occurs due to the brake-pressure build-up activation of at least one, if necessary both, of the brake-pressure regulating members 38 and/or 39, likewise the brake-pressure re-reduction.

d) Automatic Activation of the Wheel Brake of a Non-Driven Vehicle Wheel for Controlling Driving Dynamics (FDR):

For the individual or joint actuation of the wheel brakes 11 and/or 12 of the non-driven front wheels, without the cooperation of the driver, the front-axle brake circuit I is shut off relative to the brake unit 18 via the change-over valve 52. The inlet valve 47 and/or 48 of that wheel brake or those wheel brakes 11 and/or 12 to be actuated is/are changed over into the blocking position I. The brake-pressure build-up in the respective wheel brake 11 and/or 12 takes place by the brake-pressure build-up activation of the respective brake-pressure regulating member 36 and/or 37 out of the neutral middle position of the pistons 42, and the brake-pressure re-reduction by the motor-controlled retraction of the respective piston 42 into the neutral middle position. The brake-pressure generation in the respective activated wheel brake is monitored by the position transmitter 66 of the respective brake-pressure regulating member 36 or 37 or by the pressure transmitters 68 assigned individually to the wheel brakes 11 and 12 and is controlled, according to the particular control purpose, in dependence on output signals from further sensors (not specifically illustrated) whose output signals contain the information relating to the dynamic behavior of the vehicle and can likewise be processed by the electronic control unit 43 in a known way.

Due to the possibility of an automatic activation of all the wheel brakes 11 to 14, the brake system 10 thus far also satisfies the preconditions for headway control for driving in a traffic queue, and for this purpose a headway sensor assembly (not shown) must additionally be provided on the vehicle. An activation of all the vehicle brakes 11 to 14 for the purpose of such a headway control takes place in the manner of target braking with the wheel brakes 11 to 14 being loaded with brake pressure in a manner metered according to the particular requirement.

e) Automatic Full Braking—"Braking Assistant" (BA):

By utilizing the activation of the inlet valves 47, 48 and of the change-over valve 52 provided for the automatic activation of the wheel brakes 11, 12, and by activating the brake-pressure regulating members 36 to 39, it is also possible to have an automatic control of full braking which is triggered when the electronic control unit 43 recognizes from the way in which the driver actuates the brake pedal 16 that he/she wishes to have braking with as high a vehicle deceleration as possible. The triggering of such full braking, in the initial phase of which the brake-pressure regulating members 36 to 39 are activated to ensure a brake-pressure generation that is as rapid as possible and of large amount, advantageously takes place when the speed $\dot{\varphi}$ which can be monitored by the pedal position transmitter 69 and with which the driver actuates the brake pedal 16 exceeds a threshold value $\dot{\varphi}_S$. The exceeding of a threshold value $P_S$ of the rate of change of the outlet pressures which are supplied at the pressure outlets 19, 21 of the master cylinder 18 and monitored by the pressure sensors 63 and/or 64, can also be utilized for triggering automatically controlled full braking which is controlled according to plausible criteria such as:

1. continuation of full braking with the highest possible brake-pressure increase rate as long as the driver actuates the brake pedal 16 with increasing force, the development in time of which can be tracked by the output signals from at least one of the pressure sensors 63, 64;

2. continuation of full braking with a reduced brake-pressure increase rate when the driver, although following up the brake pedal according to the brake-pressure generation, nevertheless actuates the latter only with relatively little force;

3. termination of the pressure build-up operation of the brake-pressure regulating members 36 to 39 when the outlet pressure at the brake-unit pressure outlets reaches the brake pressure already fed into the wheel brakes 11 to 13, and termination of full braking when the driver eases the brake pedal 16.

The explanation of the above-mentioned functions which can be controlled by output signals from the electronic control unit 43, also explains the functioning of the latter in sufficient detail. Because a person skilled in the art can produce this control unit 43 directly with the knowledge of its purpose provided by the disclosure herein, a more comprehensive explanation of particulars regarding the circuitry of the control unit 43 is therefore not necessary. The same applies accordingly to the electronic control units 43', 43" for controlling the brake systems 20, 30 in FIGS. 2 and 3.

Insofar as constructional and functional elements of the brake systems 20, 30 illustrated in FIGS. 2 and 3, respectively use the same reference signals as the explained constructional and functional elements of the brake system 10 according to FIG. 1, this is intended to represent constructional and functional identity or similarity of the identically designated elements. Also, insofar as such elements are not specifically mentioned in the course of the explanation of the brake system 20, 30 according to FIGS. 2 and 3, this is intended to incorporate their description by reference to FIG. 1.

In the brake system 20 of FIG. 2, the brake unit consists of the tandem master cylinder 18 which can be actuated by the brake pedal 16 and which, here, can be actuated via the brake pedal 16 directly, i.e. without a brake booster being imposed. The primary pressure outlet 19, assigned to the front-axle brake circuit I, or the supply connection 19', connected to the primary pressure outlet 19, of the brake-pressure control device 22' is connected directly to the branch point 49 of the main brake line 21 of the front-axle brake circuit I. Also, non-return valves corresponding to the non-return valves 58, 59 of the brake system 10 are not provided in the brake system 20. The functional part of the brake-pressure control device 22' assigned to the front-axle brake circuit I otherwise corresponds to the embodiment of FIG. 1.

The brake-pressure regulating device 22' is, so to speak, "symmetrical" relative to its supply connections 19' and 21' which are connected to the pressure outlets 19 and 21 of the brake unit 18. Inlet valves 71, 72 are respectively assigned individually to the respective rear-wheel brakes 13, 14 and are inserted between a branch point 73 of the main brake line 61 of the rear-axle brake circuit II and the brake-pressure outlet 26 or 27, assigned to the respective rear-wheel brake 13 or 14, of the brake-pressure regulating device 22'. These inlet valves 71, 72 are also 2/2-way solenoid valves which have as a basic throughflow position 0 in which the branch point 73 of the main brake line 61 of the rear-axle brake circuit I is connected to the respective rear brake 13 or 14, and as an energized blocking position I in which the brake-line branch 74 or 76 leading further to the respective wheel brake 13 or 14 is shut off relative to the branch point 73 of the main brake line 61 of the rear-axle brake circuit II.

Here, the activation of one of the wheel brakes 11 to 14 of the brake system 20, without the cooperation of the driver by actuation of the brake unit 18 occurs by changing over the inlet valve 47, 48 or 71, 72 of the respective wheel brake 11, 12 or 13, 14 to be activated into its blocking position I and thereafter controlling the brake-pressure build-up or reduction by the respective brake-pressure regulating member 36 to 39.

This type of brake-pressure generation is also utilized in the brake system 20 in the event of automatically controlled full braking and in the event of target braking controlled by the driver as a result of the actuation of the brake pedal. The master cylinder 18 functions as a brake-pressure desired-value transmitter, and the pressure amount set by the driver is recorded by the pressure sensor 64 assigned to the front-axle brake circuit. Under the control of the electronic control unit 43', the brake-pressure build-up strokes of the pistons 42 of the brake-pressure regulating members 36 to 39 are controlled in relation to this value such that their amounts recorded by the position transmitters 66 is in a desired correlation with the desired value of the brake pressure, to obtain, for example an ideal front-axle/rear-axle brake-force distribution. Depending on the configuration of the electronic control unit 43', a brake-pressure control is also possible to the effect that, at relatively low values of the vehicle deceleration, a relatively higher brake pressure $P_{hA}$ is fed into the rear-wheel brakes 13, 14 than into the front-wheel brakes 11, 12.

In the event of anti-lock control, brake fluid previously forced out of the brake-pressure regulating members 36 to 39 is received thereby again as a result of the retraction of the pistons 42, a virtually complete pressure reduction being possible. A slight residual pressure which is caused by the thermal expansion of the brake fluid and which could remain in the rear-wheel brakes 13, 14 after the termination of a braking operation, can be reduced completely via the master cylinder 18 towards its reservoir 75 by opening the inlet valves 71, 72 after termination of the braking operation.

In the event of a failure of the electronic control and drive system for the brake-pressure regulating members 36 to 39, it is still possible, with the inlet valves 47, 48 and 71, 72 opened, by way of the brake unit 18, to build up in the two brake circuits I and II a sufficient brake pressure, and to allow a minimum vehicle deceleration complying with statutory regulations, solely by the force with which the driver actuates the brake pedal 16.

The foregoing also applies to the brake system 30 of FIG. 3 in which a "rudimentary" or basic single-circuit master cylinder 18' wherein the brake unit constitutes only one pressure outlet 19 assigned to the front-axle brake circuit I, and the master cylinder 18' once again is actuatable directly by the brake pedal 16. The brake-pressure regulating members 38, 39 of the rear-axle brake circuit II are, as described in FIG. 1, single-circuit master cylinders, of which the snifting holes 62 are, however, connected to the reservoir 75 of the brake system 30 via a compensating line 78.

The pressure-supply connection 19', via which the outlet pressure supplied at the pressure outlet 19 of the brake unit 18' in the event of braking is fed into the brake-pressure control device 22", is, as in the brake system 20 of FIG. 2, connected via the two inlet valves 47, 48 to the brake-pressure outlets 23, 24 of the brake-pressure control device 22" which are assigned to the front-wheel brakes 11, 12. In the event of a response of the anti-lock control on the two front-wheel brakes 11, 12, the brake pedal becomes, so to speak, rigid, but the driver will not judge this to be a malfunctioning of the brake system 30, because braking deceleration is maintained.

In the event of failure of electrical activation of the brake-pressure regulating members 36, 37 of the front-axle brake circuit I, a considerable brake pressure, sufficient for achieving the minimum vehicle deceleration prescribed by law, can still be built up in the front-wheel brakes 11, 12 solely as a result of the actuation of the basic or rudimentary master cylinder 18'. A control of an automatic full braking and/or the brake-pressure loading of individual or a plurality of wheel brakes, without the cooperation of the driver, takes place in the brake system 30 analogously to the corresponding functions explained with reference to the brake systems 10, 20 of FIGS. 1 and 2, respectively.

Also in the case of automatically controlled full braking in which the inlet valves 47, 48 are changed over to their blocking position I, the driver will not interpret an accompanying hardening or standstill of the brake pedal 16 as a malfunction of the brake system 30, because, in this instance too, the desired high vehicle deceleration is maintained.

The pedal-position transmitter 69 utilized for triggering automatic full braking can also be employed for controlling a target braking such that an activation of the brake-pressure regulating members 36, 37 already takes place after the output signal of the pedal-position transmitter 69 indicates "with certainty" that the connection of the outlet-pressure space of the brake unit 18' to the reservoir 75 is shut off and brake pressure can now build up. As a result, in the normal braking mode corresponding to an intact brake system 30, a desired reduction of the pedal travel is possible. In the event of a failure of the control, it is merely necessary to allow for a larger pedal travel, but one which, with a suitable dimensioning of the brake master cylinder 18', allows the build-up of a high brake pressure.

In the brake systems 10, 20 and 30 and their brake-pressure control devices 22, 22' and 22" described with reference to FIGS. 1 to 3, an "electronic" adjustability of the pedal-travel/brake pressure characteristic is, in each embodiment, possible in a simple way. That is, the adjustment of the quantity ratio, $m_S/m_B$, takes place by adjusting a weighting factor, by way of which the output signal of the sensor output signal representing the driver's wish is taken for comparison with the position actual-value signal of the position sensor 66 monitoring the piston position of the respective brake-pressure regulating member. This can be carried out by an analog follow-up control having a very rapid response. At the same time, the weighting factor for the signal representing the driver's wish can be varied as a function of the sensor output signal characteristic of the position of the piston 42 of the respective brake-pressure regulating member, for example by reducing the weighting factor for the sensor output signal representing the driver's wish with an increasing pressure build-up displacement of the pistons 42 of the brake-pressure regulating members 36, 37 of the front-wheel brakes 11, 12.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A brake-pressure control device for a road vehicle equipped with individual front and rear wheel brakes, and at least one of anti-lock control, electronically controlled brake-force distribution and drive-slip control, comprising an electronic control unit having stored data characteristic of vehicle deceleration in relation to brake pedal travel; a hydraulic multi-circuit brake system operatively associated with the electric control unit and having a driver-actuatable brake unit for brake-pressure generation and operatively connected brake-pressure regulating members configured as hydraulic regulating cylinders with electromotively drivable pistons therein configured to be activatable by output signals from the electronic control unit and position transmitters for recording a position of each of the pistons and transmitting signals representative of the piston position to the electronic control unit to (i) control brake-pressure generation in the individual wheel brakes of the road vehicle with of driver-controlled braking, (ii) obtain, independently of the driver-controlled braking, a brake pressure loading of the individual wheel brake of a driven vehicle wheel tending to spin for the drive-slip control, (iii) effect the driver-controlled braking, an automatic control of front-axle/rear-axle brake force distribution and (iv) control, during the anti-lock control on the individual wheels, brake-pressure reduction and brake-pressure rebuild-up phases, wherein the pistons of selected individual brake-pressure regulating members having a basic position from which occurs a pressure build-up stroke of the respective piston up to the maximum brake-pressure level and, starting from which level, a pressure-reduction stroke down to full pressure relief, and inlet valves operatively associated with the electronic control unit so as to selectively connect and disconnect the individual wheel brakes directly to a pressure outlet of the brake unit, wherein a) the selected individual brake pressure regulating members are the brake-pressure regulating members for at least the front-wheel brakes, b) the brake-pressure regulating members for rear-wheel brakes of the road vehicle are configured such that the basic position of the pistons thereof corresponds to the largest volume of the outlet-pressure spaces of the brake-pressure regulation members in braking not subjected to the anti-lock control, and to provide brake-pressure generation and shut off relative to the brake unit of the brake system, and c) at least one sensor configured to supply an output signal to the electronic control unit to determine an expected value of vehicle deceleration based upon the stored data in the electronic control unit with driver-controlled braking, and wherein the electronic control unit is configured to provide comparative processing of the signals characteristic of the piston positions of the brake-pressure regulating members of the front-wheel brakes with the output signal characteristic of the expected vehicle deceleration value, the electronic control unit is further configured to generate activating signals for the drives of the brake-pressure regulating members of the front-wheel brakes to cause the pistons to move into a position assigned to the expected vehicle deceleration value based upon the stored data, and also to generate activating signals for the brake-pressure build-up operation of the brake-pressure regulating members of the rear-wheel brakes.

2. The brake-pressure device according to claim 1, wherein means is provided for adjustably presetting a ratio of a brake-fluid quantity, which is forcible by the brake-pressure regulating members of the front-wheel brakes into the front-wheel brakes in the event of target braking, to a brake-fluid quantity, which is forcible out of the brake unit into the front-wheel brakes in the event of an actuation of the brake system.

3. The brake-pressure control device according to claim 2, wherein means is provided for effecting a weighting factor adjustment of the ratio of brake-fluid quantity forced into the front-wheel brakes via the associated brake-pressure regulating members to the brake-fluid quantity forced into the front-wheel brakes as a result of actuation of a master brake cylinder such that a sensor output signal representing a driver's brake demand is comparable with a position actual-value signal of a position sensor monitoring the piston position of the respective brake-pressure regulating member of the front-wheel brakes.

4. The brake-pressure control device according to claim 3, wherein the weighting factor for the signal representing the driver's wish is variable as a function of the sensor output signal characteristic of the position of the piston of the brake-pressure regulating member of an associated one of the front-wheel brakes.

5. The brake-pressure control device according to claim 4, wherein variation of the weighting factor for the sensor signal representing the driver's brake demand occurs with an increasing pressure build-up displacement of the pistons of the brake-pressure regulating members of the front-wheel brakes.

6. The brake-pressure control device according to claim 1, wherein the brake-pressure regulating members of the wheel brakes combined in a brake circuit have a self-locking drive, the brake circuit has a main brake line connected to the brake unit and arranged to be shut off relative to the brake unit by an electrically activatable change-over valve, and normally shut off non-return valves are connected parallel to the inlet valves of the brake circuit and are loaded in an opening direction by a relatively higher pressure in the wheel brakes of the brake circuit than at a brake-side connection of the change-over valve.

7. The brake-pressure control device according to claim 1, wherein the brake unit is a static dual-circuit master cylinder actuatable directly by a brake pedal of the brake system.

8. The brake-pressure control device according to claim 1, wherein the brake unit is a single-circuit master cylinder actuatable directly by a brake pedal of the brake system and to which are connected the front-wheel brakes combined to form a front-axle brake circuit.

9. The brake-pressure control device according to claim 1, wherein the brake-pressure regulating members of the rear-wheel brakes are pressure modulators, and the rear-wheel brakes are selectively connectable via an electrically activatable inlet valve to a pressure outlet of the brake unit.

10. The brake-pressure control device according to claim 9, wherein the brake-pressure regulating members of the rear-wheel brakes have a non-self-locking drive.

11. The brake-pressure control device according to claim 1, wherein the brake-pressure regulating members of the rear-wheel brakes are single-circuit master cylinders having compensating channels connectable to one of a pressure outlet of the brake unit and a reservoir of the brake system.

12. The brake-pressure control device according to claim 11, wherein the compensating channels of the brake-pressure regulating members of the rear-wheel brakes are snifting holes.

13. The brake-pressure control device according to claim 1, wherein at least one pressure sensor is operatively arranged with respect to the brake unit to generate an output signal characteristic of an outlet pressure prevailing at the pressure outlet of the brake unit.

14. The brake-pressure control device according to claim 1, wherein a pressure sensor is operatively associated with at least one of the rear-wheel brakes.

15. The brake-pressure control device according to claim 1, wherein a pressure sensor is operatively associated with at least one of the front-wheel brakes.

* * * * *